US007840722B2

(12) United States Patent
Goh et al.

(10) Patent No.: US 7,840,722 B2
(45) Date of Patent: Nov. 23, 2010

(54) METHOD FOR RECEIVING DATA OVER AN SDIO INTERFACE AND DEVICE USING THE SAME

(75) Inventors: Cheok-Yan Goh, Hsinchu (TW); Chao-Yu Hu, Miaoli County (TW)

(73) Assignee: Ralink Technology Corp., Science-Based Park, Hsin-Chu (TW)

( * ) Notice: Subject to any disclaimer, the term of this patent is extended or adjusted under 35 U.S.C. 154(b) by 132 days.

(21) Appl. No.: 12/264,257

(22) Filed: Nov. 4, 2008

(65) Prior Publication Data

US 2009/0172202 A1 Jul. 2, 2009

(30) Foreign Application Priority Data

Dec. 26, 2007 (TW) ................ 96150310 A

(51) Int. Cl.
*G06F 13/14* (2006.01)
*G06F 13/00* (2006.01)
(52) U.S. Cl. .................. 710/33; 710/305; 710/300; 710/104; 710/72; 709/208
(58) Field of Classification Search .......... 710/100, 710/104–106, 300–305, 5, 22–28, 33–35, 710/72; 709/208
See application file for complete search history.

(56) References Cited

U.S. PATENT DOCUMENTS

| 5,072,374 | A  | * | 12/1991 | Sexton et al. ............ 709/208 |
|-----------|----|---|---------|----------------------------------|
| 7,225,257 | B2 | * | 5/2007  | Aoike et al. ............. 709/225 |
| 7,277,973 | B2 | * | 10/2007 | Bando ................... 710/305   |
| 7,664,898 | B2 | * | 2/2010  | Jin et al. ................ 710/106 |
| 2006/0218324 | A1 | * | 9/2006 | Zayas ..................... 710/65  |
| 2008/0140878 | A1 | * | 6/2008 | Bar-Shalom et al. ...... 710/26  |
| 2009/0129355 | A1 | * | 5/2009 | Lin ....................... 370/338  |
| 2009/0164678 | A1 | * | 6/2009 | Hu ......................... 710/106 |
| 2009/0259786 | A1 | * | 10/2009| Lin et al. ................ 710/110  |
| 2009/0327533 | A1 | * | 12/2009| Kallam et al. ............ 710/25   |
| 2010/0011128 | A1 | * | 1/2010 | Paycher et al. ............ 710/1   |

* cited by examiner

*Primary Examiner*—Christopher B Shin
(74) *Attorney, Agent, or Firm*—Winston Hsu; Scott Margo

(57) ABSTRACT

A method for receiving data with a secure digital input/output (SDIO) interface, which is utilized for providing a data transmission connection between a master device and a slave device, starts with receiving a first packet of the data from the slave device. The first packet is transferred with a plurality of data blocks. A first data block of the plurality of data blocks has reception information of a second packet. The method then generates a control signal to receive the second packet from the slave device according to the reception information of the second packet, which is a next packet of the first packet in the data.

22 Claims, 7 Drawing Sheets

METHOD FOR RECEIVING DATA OVER AN SDIO INTERFACE AND DEVICE USING THE SAME

BACKGROUND OF THE INVENTION

1. Field of the Invention

The present invention relates to a method and related device for receiving data over an SDIO interface, and more particularly, to a data reception method and related device for enhancing data transmission rate by reducing the number of required control signals.

2. Description of the Prior Art

Secure digital input output (SDIO) interfaces are extended from secure digital (SD) interfaces, which not only can be applied in storage devices like flash memory cards, but also can be used to drive peripheral devices such as Wi-Fi wireless network cards, global positioning system (GPS) receivers, and Bluetooth adapters. Thus, with increasing requirements for functions in portable electronic products, the applications of the SDIO interface have become more and more widespread.

The SDIO interface is not a sort of high-speed data transmission interface. Despite the theoretical data transmission rate claimed by the SDIO interface specification of up to 100 Mbps, the bandwidth capability for practical applications is only about 10 percent, or even less than 10 percent, of the theoretical data rate. According to the SDIO interface specification, reasons for the data rate being lower than expectation can be roughly generalized as: redundant overhead of headers, transmission of control commands by sequential bits, long delay between two commands (or CMD-CMD Intervals), and a handshake mechanism, etc. To reduce the restrictions of the above specification, the data rate of the SDIO interface can be enhanced by transferring data with data blocks. However, due to the bus driver limitations of operating systems, the data rate and performance of the SDIO interface are not really improved when the data transfer is performed with larger data blocks. For example, in WinCE systems, the best data rate of the SDIO interface is achieved when data transmission is performed using 32-byte data blocks.

Generally speaking, at least two signal lines are needed in the SDIO interface for performing data transmission, among which one is utilized for transmitting control signals of a master device, such as commands, and the others are utilized for transmitting data. Please refer to FIG. 1. FIG. 1 is a timing diagram of a conventional SDIO interface performing data transfer. As shown in FIG. 1, the SDIO interface is utilized for providing a data transmission connection between a master device and a slave device, and includes a command line CMD_LINE and a data line DATA_LINE. When the slave device has a packet required for transmitting, the master device is triggered to initiate an interrupt procedure according to an interrupt signal INT sent by the slave device, and to generate an IO_RW_DIRECT command CMD52 to read status of the interrupt procedure from the slave device for obtaining related packet reception information. Then, the master device enters into a packet reception state and generates an IO_RW_EXTENDED command CMD53 to enable the slave device to transfer a first data block BLK_1 with a specific data length through the data line DATA_LINE, among which the first data block BLK_1 contains status information and data length information of the packet. Therefore, by the status information and the data length information of the packet obtained from the received first data block BLK_1, the master device can further generate another IO_RW_EXTENDED command CMD53 to make the slave device begin transmitting data of the packet in the form of data blocks (i.e. data blocks BLK_2 to BLK_n), wherein the number of the data blocks BLK_2 to BLK_n corresponds to data length of the packet, and data length of each data block is the same. After receiving the data blocks BLK_2 to BLK_n, the master device terminates the interrupt procedure to complete reception of the packet. In other words, when there is a next packet required to be transmitted, the slave device has to generate another interrupt signal to trigger the master device to re-enter the packet reception state.

As mentioned above, while receiving a packet from the slave device, the master device at least has to generate one IO_RW_DIRECT command CMD52 and two IO_RW_EXTENDED commands CMD53 to complete the data transfer of the packet. Besides, when the slave device has multiple continuous packets for transmitting, since the master device immediately terminates the interrupt procedure after completing reception of each packet, to receive a next packet, the master device needs to be triggered by the interrupt signal and generate the IO_RW_DIRECT command CMD52 again to re-read status of the interrupt procedure and the related reception information. However, in a multi-thread system, such as WinCE, a system bus driver has to manage interrupt requests of multiple peripheral devices, and thus long time intervals must pass between two control commands of the SDIO interface. Please refer to FIG. 2. FIG. 2 is a schematic diagram of time intervals between control commands of a conventional SDIO interface. As shown in FIG. 2, the time intervals between two control commands are substantially 100 operation cycles of the control commands. Thus, if operation of an SDIO interface peripheral device needs more control commands, more time is wasted on time delays between the control commands, resulting in the data rate being reduced significantly. If the number of required control commands could be reduced when the master device performs data reception over the SDIO interface, the data rate will be improved dramatically.

SUMMARY OF THE INVENTION

It is therefore a primary objective of the present invention to provide a method for receiving data over an SDIO Interface and devices using the same.

The present invention discloses a method for receiving data over a secure digital input/output (SDIO) interface. The SDIO interface provides a data transmission connection between a master device and a slave device. The method comprises receiving a first packet of the data from the slave device, wherein the first packet is transferred by a plurality of data blocks, and a first data block of the plurality of data blocks comprises reception information of a second packet; and generating a control signal to receive the second packet from the slave device according to the reception information of the second packet.

The present invention further discloses an electronic device for receiving data over a secure digital input/output (SDIO) interface. The electronic device comprises a reception module for establishing a data transmission connection with a slave device through the SDIO interface; an interface driving module, coupled to the reception module, for driving the SDIO interface to receive the data from the slave device; a central processing unit, coupled to the interface driving module, for executing a program code to control the interface driving module; and a memory, coupled to the central processing unit, for storing the program code, wherein the program code comprises receiving a first packet of the data from the slave device, among which the first packet is transferred by a plurality of data blocks and a first data block of the plurality of data blocks comprises reception information of a second packet; and generating a control signal to receive the second packet from the slave device according to the reception information of the second packet.

The present invention further discloses a method for receiving a packet over a secure digital input/output (SDIO) interface. The SDIO interface provides a data transmission connection between a master device and a slave device. The method comprises generating a first control signal to receive a first data block with a specific data length from the slave device when the master device enters into a packet reception state, wherein the first data block comprises data length information and data of the packet; and determining whether to generate a second control signal for receiving remaining data of the packet from the slave device according to the data length information of the packet.

The present invention further discloses an electronic device for receiving data over a secure digital input/output (SDIO) interface. The electronic device comprises a reception module for establishing a data transmission connection with a slave device through the SDIO interface; an interface driving module, coupled to the reception module, for driving the SDIO interface to receive the data from the slave device; a central processing unit, coupled to the interface driving module, for executing a program code to control the interface driving module; and a memory, coupled to the central processing unit, for storing the program code, wherein the program code comprises generating a first control signal to receive a first data block with a specific data length from the slave device when the master device enters into a packet reception state, among which the first data block comprises data length information and data of the packet; and determining whether to generate a second control signal for receiving remaining data of the packet from the slave device according to the data length information of the packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
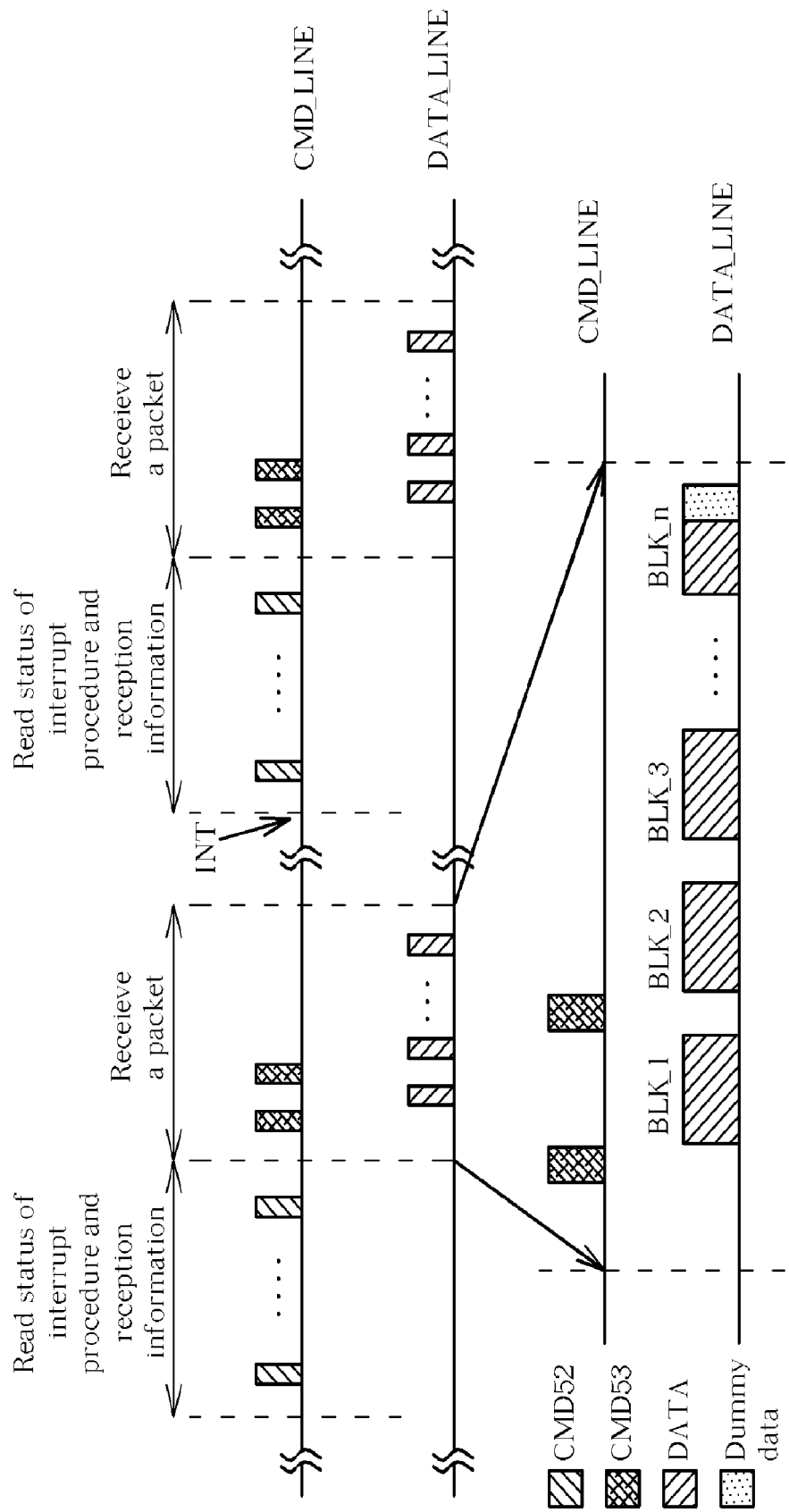
FIG. 1 is a timing diagram of a conventional SDIO interface performing data transfer.
Figure 2:
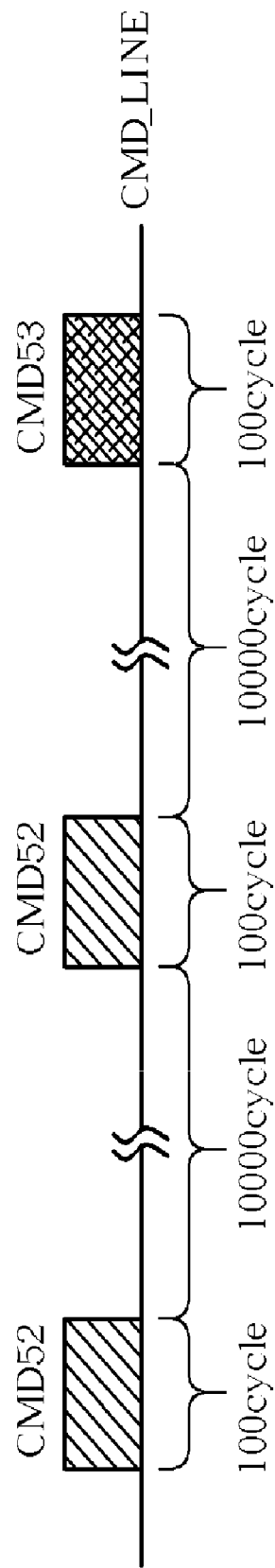
FIG. 2 is a schematic diagram of time intervals between control commands of a conventional SDIO interface.
Figure 3:
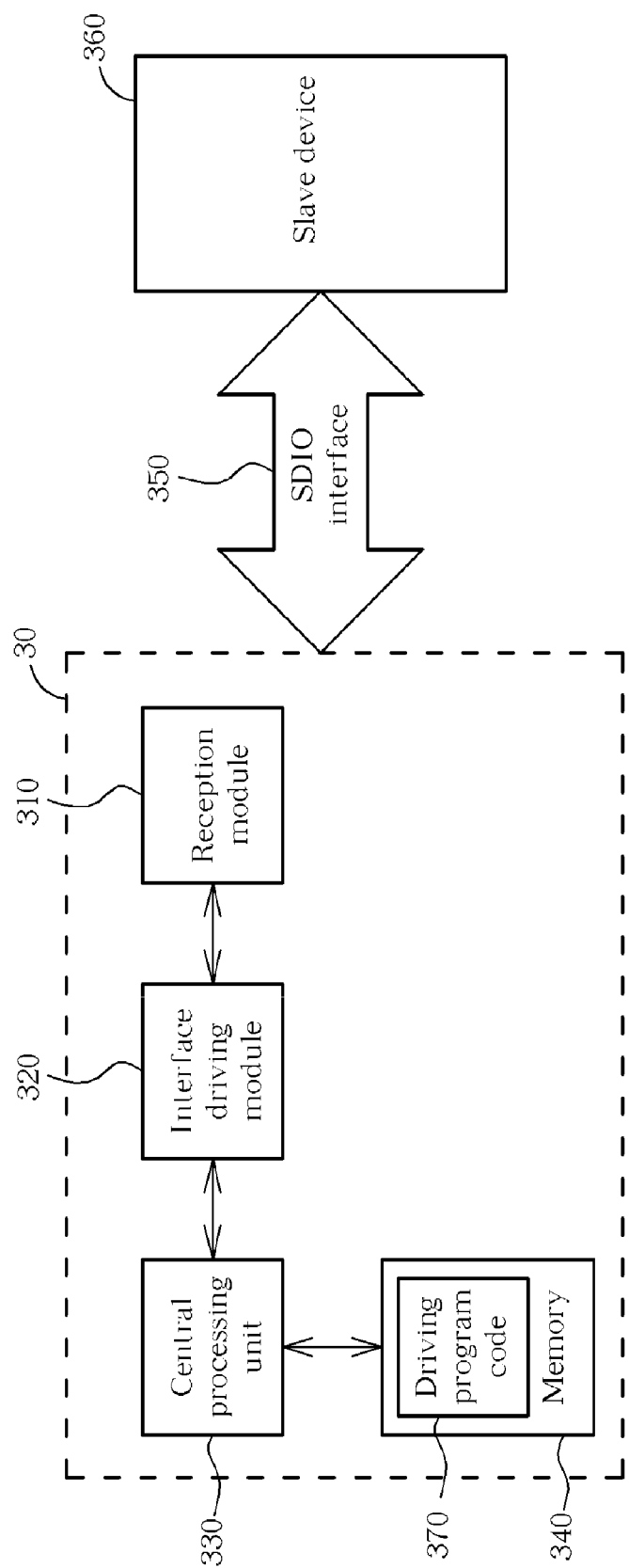
FIG. 3 is a schematic diagram of an electronic device with an SDIO interface according to an embodiment of the present invention.

Please refer to FIG. 3. FIG. 3 is a schematic diagram of an electronic device 30 with a secure digital input output (SDIO) interface according to an embodiment of the present invention. The electronic device 30 includes a reception module 310, an interface driving module 320, a central processing unit 330 and a memory 340. The reception module 310 is utilized for establishing a data transmission connection with a slave device 360 through an SDIO interface 350. The interface driving module 320 is coupled to the reception module 310, and is utilized for driving the SDIO interface 350 to receive or transmit data from or to the slave device 360. The central processing unit 330 is coupled to the interface driving module 320, and is utilized for executing a driving program code 370 to control the interface driving module 320. The memory 340 is coupled to the central processing unit 330, and is utilized for storing the driving program code 370. Thus, by executing the driving program code 370 stored in the memory 340 through the central processing unit 330, the electronic device 30 can control the interface driving module 320 to receive data from the slave device 360 or transmit data to the slave device 360. Preferably, the slave device 360 can be a peripheral device like a Wi-Fi wireless network card, a global positioning system (GPS) receiver, or a Bluetooth adapter.

Figure 4:
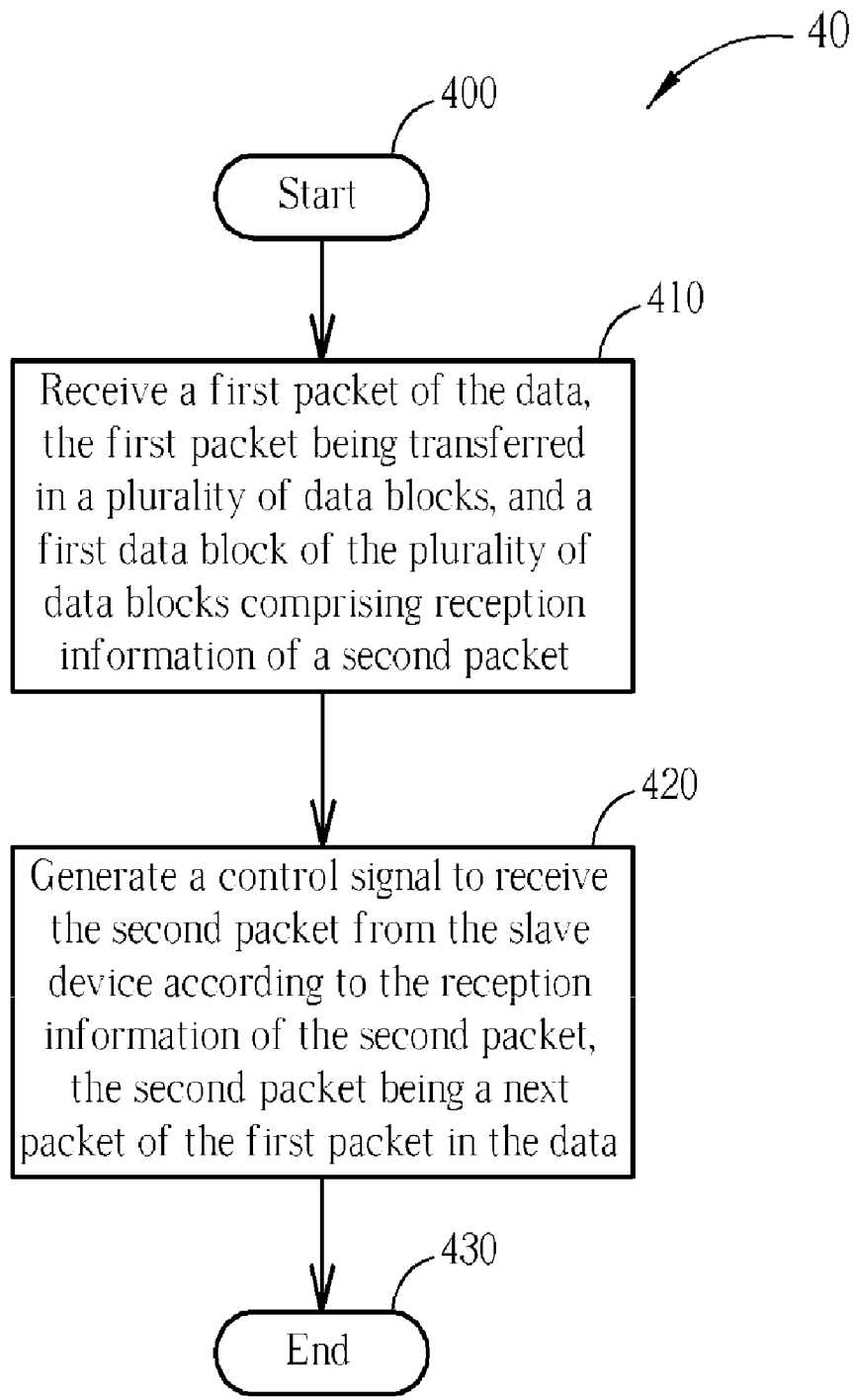
FIG. 4 is a schematic diagram of a data reception process according to an embodiment of the present invention.

In practical application, when the electronic device 30 receives data from the slave device 360 through the SDIO interface 350, the embodiment of the present invention provides a data reception process for enhancing a data reception rate of the SDIO interface 350, so as to improve system efficiency. Please refer to FIG. 4. FIG. 4 is a schematic diagram of a data reception process 40 according to an embodiment of the present invention. The data reception process 40 can be compiled to be the driving program code 370, and is utilized for controlling the interface driving module 320 to receive data from the slave device 360 for reducing the number of control signals needed to be generated, so as to enhance a data reception rate of the electronic device 30. The data reception process 40 includes the following steps:

Step 410: Receive a first packet of the data, the first packet being transferred in a plurality of data blocks, and a first data block of the plurality of data blocks comprising reception information of a second packet.

Step 420: Generate a control signal to receive the second packet from the slave device according to the reception information of the second packet, the second packet being a next packet of the first packet in the data.

Step 430: End.

According to the data reception process 40, the electronic device 30 first receives a first packet of data from the slave device 360 through the SDIO interface 350. The first packet may be transferred in a plurality of data blocks, and a first data block of the plurality of data blocks may comprise reception information of a second packet. Then, the electronic device 30 generates a control signal to receive the second packet from the slave device 360 according to the reception information of the second packet. The second packet may be a next packet of the first packet in the data. Preferably, the reception information of the second packet comprises data length information of the second packet and validation information of the second packet, and the first data block of the plurality of data blocks is a last data block of the plurality of data blocks. Besides, the control signal may be an IO_RW_EXTENDED command (CMD53) defined in an SDIO interface specification.

In other words, when the slave device 360 transmits a packet of the data to the electronic device 30 through the SDIO interface 350, the embodiment of the present invention utilizes the last data block of the packet to carry reception information of the next packet. Thus, when the last data block is received, the electronic device 30 can generate a control signal of the next packet to keep data reception of the next packet from the slave device 360 according to the reception information of the next packet, i.e. the validation information of the next packet and the data length information of the next packet. Compared with the prior art, the embodiment of the present invention can receive multiple continuous packets of the data within an interrupt procedure, and only needs to generate one control signal (CMD53) for receiving each packet, so that the number of required control signals can be significantly reduced and data reception rate can further be enhanced.

Figure 5:
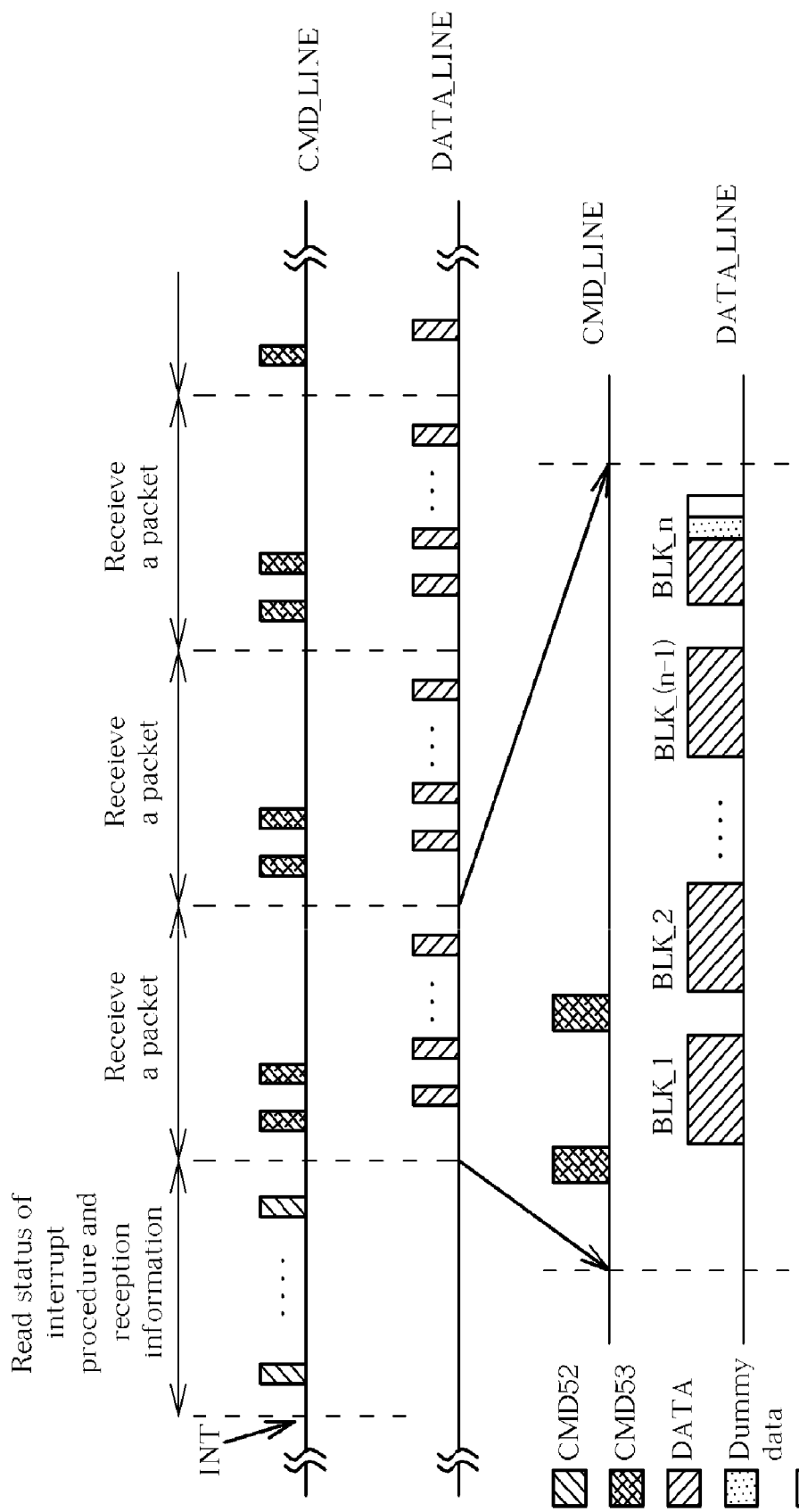
FIG. 5 is a timing diagram of an SDIO interface performing data reception according to an embodiment of the present invention.

Please refer to FIG. 5. FIG. 5 is a timing diagram of an SDIO interface performing data reception according to an embodiment of the present invention. In FIG. 5, when the electronic device 30 is triggered to receive data according to an interrupt signal INT, since the electronic device 30 does not have any information about a first packet of the data yet, the electronic device 30 has to generate an IO_RW_EXTENDED command CMD53 to enable the slave device 360 to transfer a first data block BLK_1 having a specific data length through a data line DATA_LINE, among which the first data block BLK_1 includes status information and data length information of the first packet of the data. Thus, the electronic device 30 can generate another IO_RW_EXTENDED command CMD53 to make the slave device 360 begin transmitting data of the first packet in the form of data blocks (i.e. data blocks BLK_2 to BLK_n) according to the status information and the data length information of the first packet, among which the last data block BLK_n of the first packet further comprises reception information of a next packet, such as data length information of the next packet, validation information of the next packet, etc., and dummy data for stuffing the last data block BLK_n to the specific data length. Therefore, when the last data block BLK_n is received, the electronic device 30 can generate a corresponding IO_RW_EXTENDED command CMD53 to control the slave device 360 to initiate data reception of the next packet.

If the data has multiple continuous packets that are required to be transmitted, the electronic device 30 may obtain reception information of a next packet according to the last data block of each packet in like manner, such that the electronic device 30 may determine how many data blocks are utilized for transferring the next packet by the data length information, or may determine whether to continue to receive the next packet by the validation information. In this case, the electronic device 30 only needs to generate one IO_RW_EXTENDED command CMD53 for receiving data of the next packet from the slave device 360 until reception of the data is completed.

Therefore, the electronic device 30 of the present invention can receive multiple continuous packets of data within an interrupt procedure, and only needs to generate one control command for receiving each packet, so that the number of required control commands can be significantly reduced and data reception rate of the SDIO interface can further be enhanced.

Figure 6:
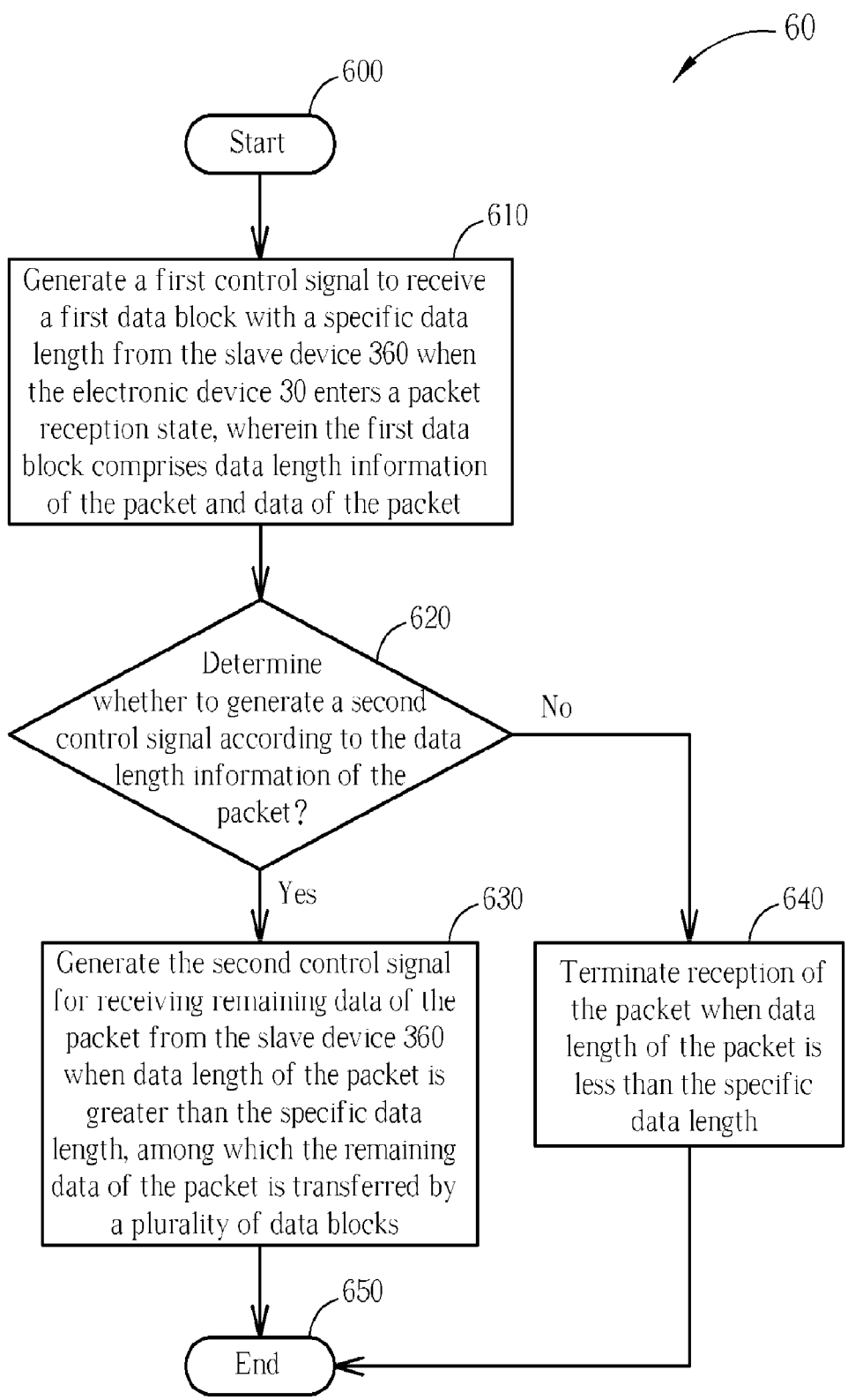
FIG. 6 is a schematic diagram of a packet reception process according to an embodiment of the present invention.

Besides, please further refer to FIG. 6. FIG. 6 is a schematic diagram of a packet reception process 60 according to an embodiment of the present invention. The packet reception process 60 can also be compiled to be the driving program code 370, and is utilized for controlling the interface driving module 320 to receive a packet from the slave device 360 for reducing the number of required control signals, so as to enhance a data reception rate of the electronic device 30. The data reception process 60 includes the following steps:

Step 600: Start.

Step 610: Generate a first control signal to receive a first data block with a specific data length from the slave device 360 when the electronic device 30 enters a packet reception state, wherein the first data block comprises data length information of the packet and data of the packet.

Step 620: Determine whether to generate a second control signal according to the data length information of the packet. If so, proceed to Step 630; and if not, proceed to Step 640.

Step 630: Generate the second control signal for receiving remaining data of the packet from the slave device 360 when data length of the packet is greater than the specific data length, among which the remaining data of the packet is transferred by a plurality of data blocks.

Step 640: Terminate reception of the packet when data length of the packet is less than the specific data length.

Step 650: End.

According to the packet reception process 60, the embodiment of the present invention can control the interface driving module 320 to generate a first control signal for receiving a first data block with a specific data length from the slave device 360 when the electronic device 30 enters a packet reception state. The first data block comprises data length information of the packet and data of the packet. Then, the embodiment of the present invention determines whether to generate a second control signal according to the data length information of the packet. When data length of the packet is greater than the specific data length, the embodiment of the present invention controls the interface driving module 320 to generate the second control signal for receiving remaining data of the packet from the slave device 360, among which the remaining data of the packet is transferred in a plurality of data blocks. Conversely, when the data length of the packet is less than the specific data length, the electronic device 30 can accordingly determine that data reception of the packet is completed, and terminate the packet reception state. Preferably, the first control signal and the second control signal are IO_RW_EXTENDED commands (CMD53) defined in an SDIO interface specification.

That means, when the electronic device 30 receives a packet, the embodiment of the present invention can utilize the first data block transmitted by the slave device 360 to carry the data length information of the packet and the data of the packet. In this case, when the data length of the packet is less than a predetermined data block size, the electronic device 30 can accordingly determine that data reception of the packet is completed, and thus there is no need to generate the second control signal for receiving remaining data. Therefore, compared with the prior art, in which the first data block transmitted by the slave device 360 merely includes the status and the data length information of the packet, the embodiment of the present invention can save the number of control signals needed to be generated, so as to enhance the data reception rate of the SDIO interface.

Figure 7:
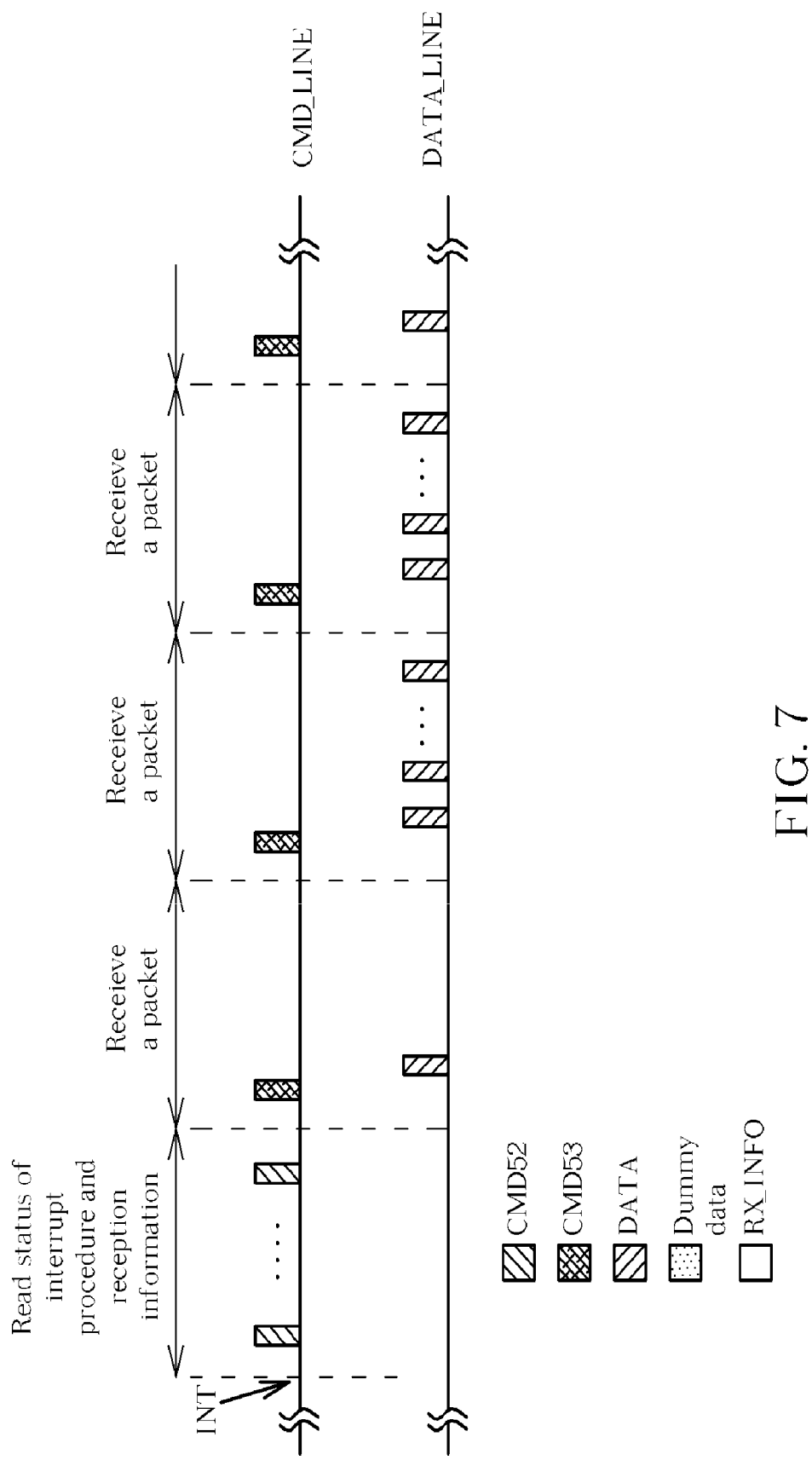
FIG. 7 is a timing diagram of an SDIO interface performing data reception according to a preferred embodiment of the present invention.

Please note that the above embodiments are merely exemplary illustrations of the present invention and those skilled in the art can certainly make appropriate modifications according to practical demands. For example, the data reception process 40 and the packet reception process 60 may be combined appropriately in the present invention, and may also be compiled to be the driving program code 370 for obtaining the best data rate when performing data reception. Please refer to FIG. 7. FIG. 7 is a timing diagram of an SDIO interface performing data reception according to a preferred embodiment of the present invention. In FIG. 7, when a first packet of data being received by the electronic device 30 has length less than a predetermined data block size, the electronic device 30 then only needs to generate one IO_RW_EXTENDED command CMD53 for receiving each packet of the data from the slave device 360, so that a best data rate of the SDIO interface can be achieved in this case.

As mentioned above, the present invention respectively utilizes the first data block and the last data block of the transferred packet to carry the data of the packet and the reception information of the next packet for reducing the number of required control signals, so that the data reception rate of the SDIO interface can be enhanced significantly.

Those skilled in the art will readily observe that numerous modifications and alterations of the device and method may be made while retaining the teachings of the invention.

What is claimed is:

1. A method for receiving data over a secure digital input/output (SDIO) interface, comprising:
   receiving a first packet of the data from a slave device, wherein the first packet is transferred in a plurality of data blocks and a first data block of the plurality of data blocks comprises reception information of a second packet; and
   generating a control signal to receive the second packet from the slave device according to the reception information of the second packet.

2. The method of claim 1, wherein the first data block of the plurality of data blocks is a last data block of the plurality of data blocks.

3. The method of claim 2, wherein the last data block comprises dummy data for stuffing the last data block to a specific data length.

4. The method of claim 1, wherein the reception information of the second packet comprises data length information of the second packet.

5. The method of claim 1, wherein the reception information of the second packet comprises validation information of the second packet.

6. The method of claim 5 further comprising determining whether reception of the data is completed according to the validation information of the second packet.

7. The method of claim 1, wherein the control signal is an IO_RW_EXTENDED command (CMD53) defined in an SDIO interface specification.

8. An electronic device for receiving data over a secure digital input/output (SDIO) interface, the electronic device comprising:
   a reception module for establishing a data transmission connection with a slave device through the SDIO interface;
   an interface driving module, coupled to the reception module, for driving the SDIO interface to receive the data from the slave device;
   a central processing unit, coupled to the interface driving module, for executing a program code to control the interface driving module; and
   a memory, coupled to the central processing unit, for storing the program code,
   wherein the program code comprises:
      receiving a first packet of the data from the slave device, wherein the first packet is transferred by a plurality of data blocks and a first data block of the plurality of data blocks comprises reception information of a second packet; and
      generating a control signal to receive the second packet from the slave device according to the reception information of the second packet.

9. The electronic device of claim 8, wherein the first data block of the plurality of data blocks is a last data block of the plurality of data blocks.

10. The electronic device of claim 9, wherein the last data block comprises dummy data for stuffing the last data block to a specific data length.

11. The electronic device of claim 8, wherein the reception information of the second packet comprises data length information of the second packet.

12. The electronic device of claim 8, wherein the reception information of the second packet comprises validation information of the second packet.

13. The electronic device of claim 12, wherein the program code further comprises determining whether reception of the data is completed according to the validation information of the second packet.

14. The electronic device of claim 8, wherein the control signal is an IO_RW_EXTENDED command (CMD53) defined in an SDIO interface specification.

15. A method for receiving a packet over a secure digital input/output (SDIO) interface for providing a data transmission connection between a master device and a slave device, the method comprising:
   generating a first control signal to receive a first data block with a specific data length from the slave device when the master device enters a packet reception state, wherein the first data block comprises data length information and data of the packet; and
   determining whether to generate a second control signal for receiving remaining data of the packet from the slave device according to the data length information of the packet.

16. The method of claim 15, wherein determining whether to generate the second control signal for receiving the remaining data of the packet from the slave device according to the data length information of the packet comprises:
   generating the second control signal for receiving the remaining data of the packet from the slave device when data length of the packet is greater than the specific data length, wherein the remaining data of the packet is transferred by a plurality of data blocks, and data length of each of the plurality of data blocks is equal to the specific data length.

17. The method of claim 15, wherein determining whether to generate the second control signal for receiving the remaining data of the packet from the slave device according to the data length information of the packet comprises:
   determining that reception of the packet is completed when data length of the packet is less than the specific data length.

18. The method of claim 15, wherein the first control signal and the second control signal are IO_RW_EXTENDED commands (CMD53) defined in an SDIO interface specification.

19. An electronic device for receiving a packet over a secure digital input/output (SDIO) interface, the electronic device comprising:
   a reception module for establishing a data transmission connection with a slave device through the SDIO interface;
   an interface driving module, coupled to the reception module, for driving the SDIO interface to receive the data from the slave device;
   a central processing unit, coupled to the interface driving module, for executing a program code to control the interface driving module; and
   a memory, coupled to the central processing unit, for storing the program code, wherein the program code comprises:
generating a first control signal to receive a first data block with a specific data length from the slave device when the master device enters a packet reception state, wherein the first data block comprises data length information and data of the packet; and
determining whether to generate a second control signal for receiving remaining data of the packet from the slave device according to the data length information of the packet.

20. The electronic device of claim 19, wherein determining whether to generate the second control signal for receiving the remaining data of the packet from the slave device according to the data length information of the packet comprises:
generating the second control signal for receiving the remaining data of the packet from the slave device when data length of the packet is greater than the specific data length, wherein the remaining data of the packet is transferred in a plurality of data blocks, and data length of each of the plurality of data blocks is equal to the specific data length.

21. The electronic device of claim 19, wherein determining whether to generate the second control signal for receiving the remaining data of the packet from the slave device according to the data length information of the packet comprises:
determining that reception of the packet is completed when data length of the packet is smaller than the specific data length.

22. The electronic device of claim 19, wherein the first control signal and the second control signal are IO_RW_EXTENDED commands (CMD53) defined in an SDIO interface specification.

* * * * *